United States Patent [19]

Fichtner

[11] Patent Number: 4,562,642

[45] Date of Patent: Jan. 7, 1986

[54] APPARATUS FOR WINDING AND INSERTING OF COILS INTO STATORS OR ROTORS OF ELECTRICAL MACHINES

[76] Inventor: Karl-Heinz Fichtner, Von Eiff Str. 37 u. 41, 6450 Hanau/Main 7, Fed. Rep. of Germany

[21] Appl. No.: 526,792

[22] Filed: Aug. 26, 1983

[30] Foreign Application Priority Data

Aug. 30, 1982 [DE] Fed. Rep. of Germany ....... 3232230

[51] Int. Cl.$^4$ ............................................. H05K 15/10
[52] U.S. Cl. .......................................... 29/734; 29/736
[58] Field of Search .................. 29/596, 734, 736, 732

[56] References Cited

U.S. PATENT DOCUMENTS 3,579,791  5/1971  Arnold ................................ 29/606 X

FOREIGN PATENT DOCUMENTS 94566  7/1980  Japan ..................................... 29/734

*Primary Examiner*—Howard N. Goldberg
*Assistant Examiner*—Timothy Eley
*Attorney, Agent, or Firm*—Larson and Taylor

[57] ABSTRACT

Apparatus for winding and insertion of coils in stators or rotors of electrical machines has a winding station and an insertion station, between which insertion tools 14 are transported by means of a rotary table 10. At the winding station, there is a template 24 which cooperates with a winding nozzle 26. Covering strip mechanism 44 has a rotationally movable guide duct 62 and guide portion 70, by means of which insulating strips 58 are introduced successively into ducts 52 provided for them between the tongues 50 of insertion tool 14. To reach with the guide duct 62 and guide portion 70, all the ducts 52 are situated on circumferences of different size depending on the particular insertion tool 14. Guide portion 70 is rotatable about the central longitudinal axis of insertion tool 14 by means of an adjusting motor 48, and is adjustable radially by means of an adjusting motor 46.

12 Claims, 3 Drawing Figures

APPARATUS FOR WINDING AND INSERTING OF COILS INTO STATORS OR ROTORS OF ELECTRICAL MACHINES

FIELD OF THE INVENTION

The invention relates to apparatus suitable for winding and inserting coils into e.g. slotted cores of stators (optionally a laminated stator core) of electrical machines, said apparatus having: a winding station, comprising a template and a winding nozzle rotatable about said template; insertion tools comprising tongues arranged in a ring formation, each said tool comprising tongues such that coils produced on said template can be transferred to said insertion tools; an insertion station, comprising a holding device for laminated stator cores, such that said coils and insulating strips can be inserted by said insertion tools into slots of said stator cores; transport mechanism for transporting said insertion tools between said winding station and said insertion station; and covering strip mechanism for producing and introducing said insulating strips into ducts between the tongues of the respective said insertion tools.

BACKGROUND OF THE INVENTION

A winding and inserting apparatus of the above kind is described e.g. in U.S. Pat. Nos. 4,221,243 and 4,265,012. In those specifications, the transport mechanism for the insertion tools is a rotary table with a vertical axis whereby said insertion tools are transported, rotating in a circle, between a winding station, an insertion station, and a third station. At said third station, insulating strips (i.e. so-called covering strips) for closing stator slots can be introduced into ducts bounded by the tongues of the insertion tools. Said third station can be before or after said winding station in the direction of movement of the rotary table or of another suitable conveyor (e.g. a belt conveyor) according to choice.

Owing to the fine processing which their many parts require, insertion tools are comparatively expensive relative to the cost of the entire apparatus. Normally, a winding and inserting apparatus is allocated a plurality of inter-changeable sets of different insertion tools. An object of the present invention is to simplify known apparatus of the kind specified so as to enable a smaller number of insertion tools to be provided.

SUMMARY OF THE INVENTION

The present invention provides apparatus (and a method utilising said apparatus) suitable for winding and inserting coils into slotted cores of stators (optionally a laminated stator core) or into internally slotted rotors of electrical machines, said apparatus having: a winding station, comprising a template and a winding nozzle rotatable about said template; insertion tools comprising tongues, such that coils produced on said template can be transferred to said insertion tools; an insertion station comprising a holding device for stator laminations, such that said coils and insulating strips can be inserted by said insertion tools into slots of said stator cores or of said rotors; transport mechanism for transporting said insertion tools between said winding station and said insertion station; and covering strip mechanism for producing and introducing said insulating strips into ducts between said tongues of the respective said insertion tools, wherein said covering strip mechanism is at said winding station and comprises rotationally movable guide mechanism for bringing said insulating strips to said ducts of a said insertion tool, such that said strips can be accommodated between said tongues of said insertion tool.

The present invention affords the advantage that the said station at which the insertion tools are filled with insulating strips can be dispensed with, and therefore one insertion tool per set in each case likewise. This result can be arrived at by arranging said covering strip mechanism in a manner known per se at the insertion station. Covering strip mechanism has hitherto been provided additionally with a rotationally steppable magazine drum, to avoid having to begin each time with relatively slow production and positioning of insulating strips only after an insertion tool with coils has been moved into the insertion station, and then having to carry out the insertion operation after the production of the insulating strip during the same cycle time. This would have resulted in excessively long cycle times for the rotary table. But, a magazine drum for the insulating strip adds considerably to the cost and the size of the apparatus. Therefore, in the initially mentioned winding and inserting apparatus, it was only possible to dispense with the magazine drum, and that each insertion tool could be filled duct by duct directly with insulating strip, because a special station was available at the periphery of the rotary table. This remedy had the advantage that to introduce the insulating strips individually one after the other into the ducts of each insertion tool, the insertion tool itself could be rotated stepwise in duct angle steps, so that nothing needed to be altered in the usual stationary covering strip mechanism, apart from the omission of the rotationally steppable magazine drum, but an additional insertion tool was required in each case, as already mentioned.

In order to depart from an alternative for attaining of economically acceptable cycle times which has obtained hitherto (and has been unfavourable as regards production technique and costs), of resorting either to a magazine drum for the insulating strips, or to an additional station with a further insertion tool, in a preferred embodiment of the present invention, said rotationally movable guide mechanism is adapted to introduce said insulating strips singly in succession to one another into said ducts between said tongues of a said insertion tool. In this case, instead of the known magazine drum, it is sufficient for said rotationally movable guide mechanism to comprise an individual guide portion that is directed successively to the ducts bounded by the tongues of a said insertion tool when situated at the winding station, and guides shaped insulating strips into those ducts. Rotary shiftability of this guide portion (contrary to what is the case in the construction specified initially) is required because the filling of said ducts with insulating strips at the winding station can take place only while the insertion tool itself is held fast against relative rotational movement during the winding and the stripping of coil turns from the template onto the tongues of the insertion tool.

The shifting of the covering strip mechanism to the winding station (with covering strip mechanism comprising a rotationally movable guide portion for a single insulating strip end) enables the further advantageous possibility that the guide portion need only be rotatable to and fro through less than 360°, because the insertion tool itself at the winding station is indexed onwards by a specific angle step in each case after the winding and stripping of each coil group. The shifting must be ensured that at any given instant only either a rotary drive of a said insertion tool or a rotary drive of said guide portion of the covering strip mechanism is operative. Therefore, preferably only a single rotary drive motor is provided for those two rotary movements, the motor being changed-over by couplings. Alternatively, for said purpose, two drive motors can be provided with suitable control to ensure that only one of the motors is switched-in at any one time.

The present invention is not dependent on whether the winding and inserting of coils occur with the central longitudinal axis of the insertion tools in a substantially horizontal or vertical position. The former alternative is suitable more particularly for large stators. When winding with said axis horizontal, it is known to provide holding bars for the coils and beside a transfer tool consisting of bars, which transfer tool serves as an intermediate support for the coils between the template and an insertion tool, so that the said coils can be held substantially radially aligned on the transfer tool. It has not been known that the coils can also advantageously be held radially aligned on an insertion tool at an insertion station by holding bars. To this end, the present invention also provides optional holding bars, capable of moving radially inwardly relative to a said insertion tool during the inserting operation, and capable of withdrawing from the coils. The conveying of the coils from the winding station to the insertion station and in a state of radial alignment imposed by the holding bars is also part of the present invention and is not dependent on where and in what way insulating strips are introduced into the insertion tool.

BRIEF DESCRIPTION OF THE DRAWINGS

The present invention will now be described by way of example with reference to the accompanying drawings in which.

DETAILED DESCRIPTION OF THE PREFERRED EMBODIMENTS

Figure 1:
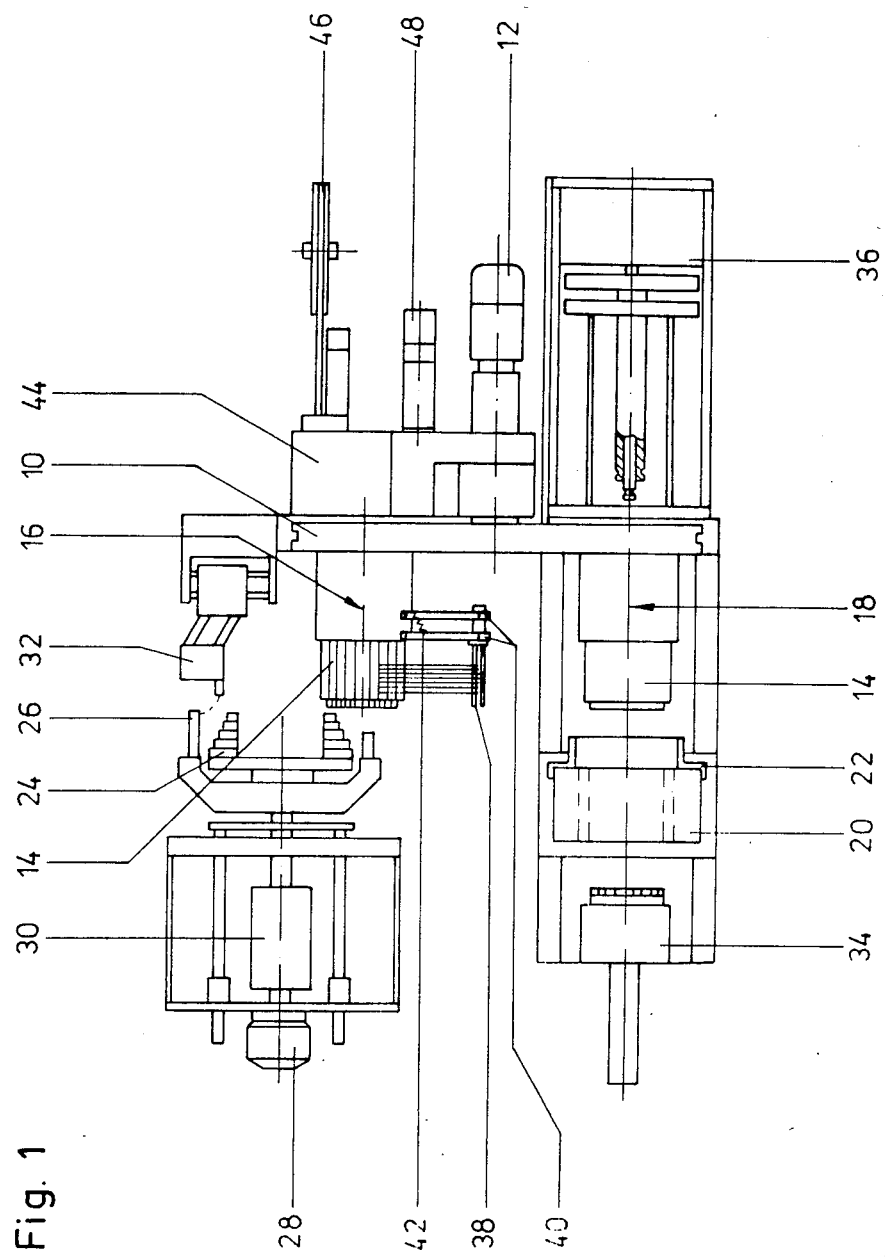
FIG. 1 is a simplified plan view of a winding and inserting apparatus of the invention.

The winding and inserting apparatus of FIG. 1 belongs to a category of automatic machines, as described e.g. in U.S. Pat. No. 3,973,601, U.S. Pat. No. 3,579,818 or U.S. Pat. No. 3,672,040. A rotary table 10 has its axis horizontal and has a drive motor 12. The table 10 carries e.g. two insertion tools 14, known per se as described in detail as regards their basic construction e.g. in U.S. Pat. Nos. 3,559,268, 3,828,830 and 3,324,536. By stepwise shifting movements of table 10 at the given working cycle, insertion tools 14 are moved in succession into two control positions or working stations. At winding stations 16 (shown above in FIG. 1), wire windings or coils are produced and transferred to an insertion tool 14. At insertion station 18 (shown below in FIG. 1), the windings are in the manner described in the last-mentioned prior publications inserted into laminated stator cores 20 by means of said insertion tool while said cores are securely clamped in a holder 22.

The coils are produced in known manner at winding station 16, which has a multi-part, generally stepped template 24 and a winding nozzle 26 revolving about template 24. Nozzle 26 has a rotary drive 28. Template 24 has an axial adjusting drive 30. Preferably, template 24 is provided with stripper elements (not shown) to strip-transfer most wire turns (already during the winding operation) onto an insertion tool 14 extending into template 24 during the winding operation. Such templates with stripper elements are described in more detail in U.S. Pat. No. 3,872,897. It is possible to use templates of the kind shown in U.S. Pat. No. 3,510,939, or templates on which all the wire turns belonging to a coil or coil group are collected first of all before (after the conclusion of the winding operation) they are pushed jointly onto insertion tool 14.

A mechanism 32 is also known in its basic construction (FIG. 1) for clamping and cutting of winding wire each time after winding of all the windings to be accommodated on an insertion tool 14, or after the production of a single coil group, depending on the type of winding in the motor being produced.

U.S. Pat. No. 3,510,939 can be consulted regarding the basic construction of insertion station 18, which has a drive device 36 for the insertion movement, in addition to holder 22 for a laminated stator core 20, and a known holding-down device 34 with aligning star. After each shifting step of rotary table 10, drive rods move through an opening in table 10 into insertion tool 14, and push into laminated stator core 20 specific parts of the insertion tool 14 (namely so-called insertion tongues and an insertion star), the coils suspended on the insertion tool, and the insulating strips introduced previously into suitable ducts between covering strip tongues. As regards details of the tool parts involved in that insertion operation, and the course of its operation, reference is to be made to the last-mentioned publication and also to U.S. Pat. No. 3,324,536.

Independently of the type of template 24 (and the manner described hereinafter of introducing the insulating strips into insertion tools 14), a feature of the apparatus shown in FIG. 1 is that holding bars 38 are arranged respectively on housing 37 (FIG. 2) of each insertion tool 14 (or on rotary table 10 adjacent insertion tools 14) and laterally offset and parallel, to be mobile such that bars 38 take up at the winding station 16 the radially extended working position shown in FIG. 1, in which position the coil turns stripped from template 24 onto an insertion tool 14 are thereby received and held in radial alignment. Without holding bars 38, the coil turns when the central longitudinal axis of the insertion tool 14 is horizontal would fall about, e.g. when that tool is carrying out its rotary shifting movements, and possibly take up a position that would impair further working operations. Adjacent each insertion tool 14, as many groups of holding bars 38 are movably mounted as there are coil groups to be accommodated in the insertion tool 14. During conveying of insertion tools 14 from winding station 16 to insertion station 18, holding bars 38 remain in radially extended position and hold the coil turns in radial alignment. However, during the insertion operation at insertion station 18, holding bars 38 must be withdrawn from the coils so as not to hinder the insertion operation. In the present example, holding bars 38 are mounted on a parallel guide consisting of parallel struts 40, movable by a spring 42 into radially extended position. If during the insertion operation, the radially external ends of the coils situated on holding bars 38 are drawn radially inwardly, guide 40 can yield, tensioning spring 42 (for this purpose the parallel struts 40 should in the radially extended position of holding bars 38 not yet be directed precisely at right angles to the central longitudinal axis of insertion tool 14), and at the same time swing struts 40 towards rotary table 10 and withdraw holding bars 38 from the coils.

FIG. 1 shows the basic arrangement of a covering strip mechanism 44, which comprises a covering strip supply reel 46 at winding station 16, and adjacent a rotary drive motor 48 for rotary shifting movements of insertion tool 14 at winding station 16. More detail of covering strip mechanism 44 is in FIG. 2, and an alternative mechanism to that mechanism is in FIG. 3. Reference should be made to U.S. Pat. No. 4,233,729 for additional information about feed apparatus and shaping apparatus for insulating strips. Usually such covering strip mechanisms at first introduce individually successively shaped and cut insulating strips into suitable grooves of a magazine drum, from which drum they are then pushed together and at the same time (by covering strip push elements arranged in a ring formation and belonging to drive device 36) into an insertion tool and furthermore into the slots of a laminated stator core 20. But, the covering strip mechanism shown in FIG. 2 or 3 is so designed that it introduces the insulating strips singly into respective associated ducts 52 (see FIG. 3) bounded by covering strip tongues 50 (FIG. 2) of insertion tool 14, so that the insulating strips are stored directly in insertion tool 14 instead of being stored in a magazine drum.

At the winding station 16 (FIG. 2) no drive rods of any kind act on insertion star 54 and on insertion tongues 56. The drive rods of drive device 36 remain at insertion station 18, so that at rotary table 10's side which is opposite from insertion tool 14 there are at winding station 16 besides the covering strip apparatus no drive or other parts which could hinder the functioning of the covering strip mechanism.

Figure 2:
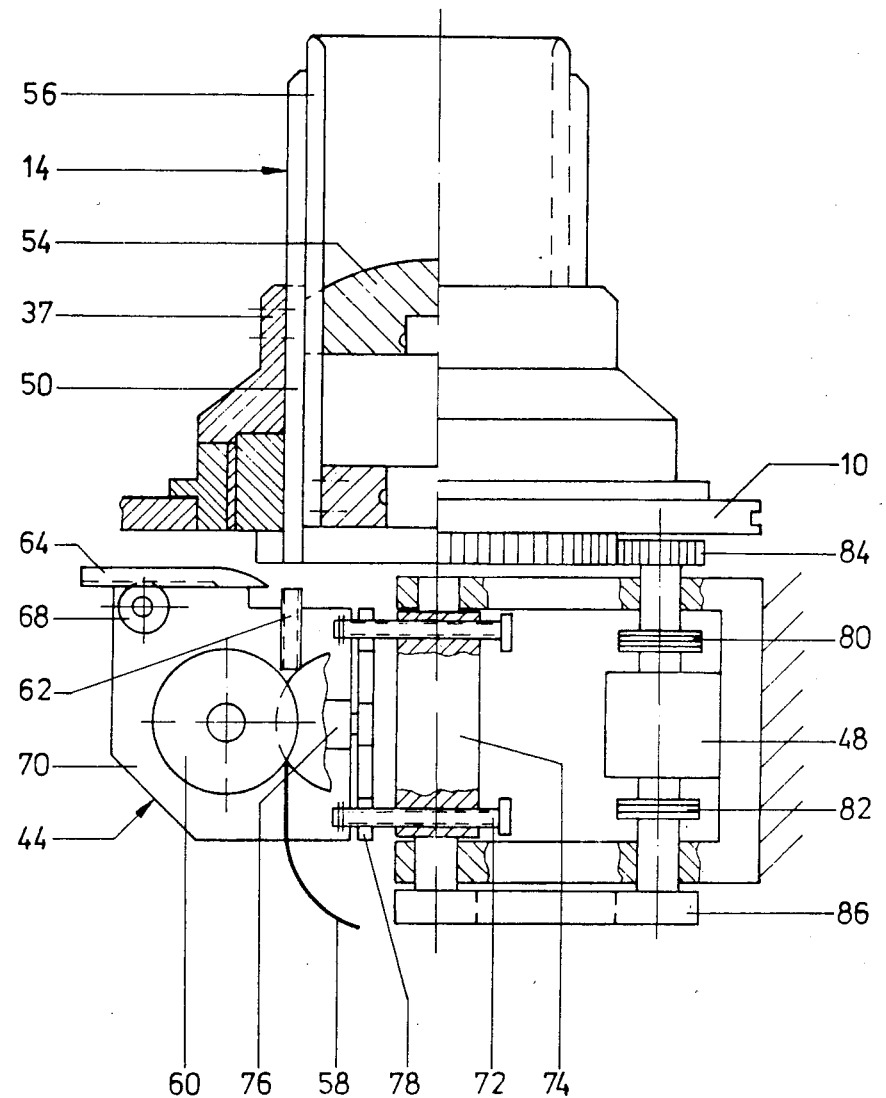
FIG. 2 is an axial longitudinal section through an insertion tool at the winding station of the apparatus of FIG. 1, and covering strip mechanism is at the rear side of said winding station.
Figure 3:
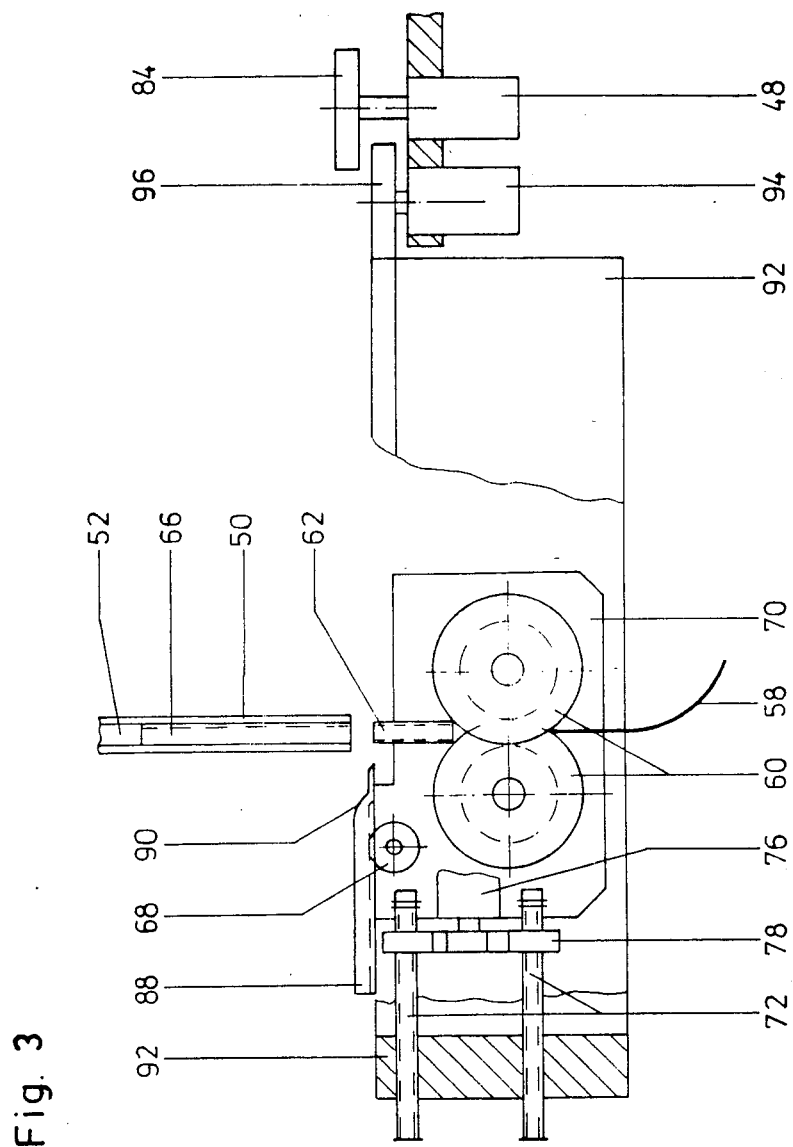
FIG. 3 is an alternative to the covering strip mechanism of FIG. 2.

Further components of insertion tool 14 shown in FIG. 2 are described in U.S. Pat. No. 4,265,012.

In covering strip mechanism 44 (FIG. 3), a strip-form insulating material 58 drawn from supply reel 46 is shaped between conveying and shaping rollers 60 to form a specific, substantially U-shaped profile, and then fed into ducts 52 via a guide duct 62 which can be arranged in alignment with the individual ducts 52 between covering strip tongues 50. After a specific length of insulating strip 58 is situated in a duct 52, that length is cut off between guide duct 62 and insertion tool 14 by means of a knife 64 from the strip coming from the supply reel 46. FIG. 3 shows a cut insulating strip 66 of this kind. The motor drive 68 (FIG. 2) of knife 64 is via a pinion and rack.

To allow guide duct 62 to be brought successively to individual ducts 52 of insertion tool 14 in the case of interchangeable insertion tools of different diameter, guide duct 62 is secured on a guide portion 70 mounted to be capable of rotational movement and adjustable radially in relation to the central longitudinal axis of insertion tool 14. Also mounted on guide portion 70 are shaping rollers 60 and knife 64 with its drive 68, so that all of the last-mentioned parts maintain their positions relative to one another irrespective of which of ducts 52 of insertion tool 14 guide duct 62 is brought to. By means of associated screw spindles 72, guide portion 70 is secured on a shaft 74 coaxial with the central longitudinal axis of insertion tool 14 so as to be non-rotatable relative to shaft 74 but adjustable radially relative to said axis. Radial adjustment is effected by an adjusting motor 76, which acts on screw spindles 72 or on nuts guided thereon, e.g. by way of a toothed belt drive 78. Thus, by means of motor 76 the spacing of guide duct 62 from the central longitudinal axis of insertion tool 14 can be adjusted and modified.

In FIG. 2, motor 48 is used as rotary drive for shaft 74 and thus drives guide portion 70. Motor 48 selectively by means of couplings 80 and 82 either indexes-on the insertion tool 14 between the winding operations of the individual coil groups via a toothed belt drive or another transmission 84, or via a toothed belt drive 86 drives the shaft 74 with the guide portion 70 rotatably, so that, with insertion tool 14 stationary, and guide duct 62 adjusted radially by means of motor 76, guide duct 62 can be guided stepwise from one duct 52 to the next in insertion tool 14.

FIG. 3 corresponds in principle to FIG. 2, and has the same reference numerals for similar parts. The following differences should be noted. A knife 88 (FIG. 3) is used which, at its side facing towards insertion tool 14 and sufficiently behind the knife's cutting edge, is provided with a cam surface 90 which pushes the cutoff insulating strips 66 still further into ducts 52. There, those strips retain their position owing to their own elasticity until they are pushed at insertion station 18 into the slots of the laminated stator core 20. By means of screw spindles 72, guide portion 70 is secured not to a central shaft but to a ring 92, and by means of motor 76 is radially inwardly adjustable to a greater or less degree relative to ring 92. This construction is intended for small stator diameters. Ring 92 is rotatably driven by a motor 94 via a toothed belt drive 96 or another suitable transmission means, independently of rotary drive motor 48 of insertion tool 14. Control of motors 48 and 94 ensures that they can be switched-in and operated only singly.

The winding and insertion apparatus described with reference to the accompanying drawings can be used not only for stators but also for internally slotted rotors.

I claim:

1. Apparatus suitable for winding and inserting coils together with covering strips into slotted devices such as the cores of stators or internally of rotors of electrical machines, said apparatus having: a winding station, comprising a template and a winding nozzle rotatable about said template; insertion tools comprising tongues, such that coils produced on said template can be transferred to said insertion tools; an insertion station, comprising a holding device for slotted devices, such that said coils and insulating strips can be inserted by said insertion tools into the slots of the slotted device; transport mechanism for transporting said insertion tools between said winding station and said insertion station; and covering strip mechanism for producing and introducing insulating strips into ducts between said tongues of the respective said insertion tools, wherein said covering strip mechanism is at said winding station and comprises rotationally movable guide mechanism for bringing said insulating strips to said ducts of a said insertion tool, such that said strips can be accommodated between said tongues of said insertion tool.

2. Apparatus according to claim 1, wherein said rotationally movable guide mechanism is adapted to introduce said insulating strips singly in succession to one another into said ducts of a said insertion tool.

3. Apparatus according to claim 1, comprising a supply reel for supplying insulating strips in said rotationally movable guide mechanism, those strips being adapted to be shaped to a substantially U-shaped form and to be cut off from said supply reel.

4. Apparatus according to claim 3, comprising: shaping rollers for shaping sad insulating strips, said rollers also being used for feeding said shaped strips into said ducts of a said insertion tool; and motor means for adjusting said rollers in their positions relative to one another, this adjustment being in accordance with the particular shape of said shaped strip to be produced.

5. Apparatus according to claim 3, comprising a knife having a cutting edge for cutting off said shaped strips, said knife being directly adjacent an entrance of a said duct to be filled with an insulating strip, and at said knife's side facing towards said duct said knife has a cam surface behind the cutting edge, such that said cut strips can be pushed further into said ducts.

6. Apparatus according to claim 5, wherein said rotationally movable guide mechanism is secured on a shaft mounted rotatably co-axially to a central longitudinal axis of said insertion tools, said rotatably movable guide mechanism being adjustable radially, and supporting at a radially adjustable end thereof said shaping rollers and said knife.

7. Apparatus according to claim 6, comprising motor means for radially adjusting said rotationally movable guide mechanism.

8. Apparatus according to claim 5, wherein said rotationally movable guide mechanism is secured on a ring mounted rotatably coaxially to a central longitudinal axis of said insertion tools, and is adjustable radially inward, and supports at a radially adjustable end thereof said shaping rollers and said knife.

9. Apparatus according to claim 1, wherein said insertion tools have a rotary drive; and said rotationally movable guide mechanism has a rotary drive independent of said rotary drive of said insertion tools.

10. Apparatus according to claim 1, wherein said insertion tools have a rotary drive; and said rotationally movable guide mechanism has the same rotary drive as said insertion tools, said drive mechanism being adapted to be switched by means of couplings so as to provide those alternative drivings.

11. Apparatus according to claim 1, wherein said rotationally movable guide mechanism is rotatable to and fro through less than 360°.

12. Apparatus according to any one of claims 1 and 2 to 11, wherein said template and said insertion tools have central longitudinal axes, which axes and the axis of rotation of said rotationally movable guide mechanism are situated substantially horizontally; and on said insertion tools there are radially externally of annularly disposed tongues thereof holding bars for the coils hanging in a said insertion tool, said bars being movable radially inwardly during the insertion operation provided by said insertion tool.

* * * * *